United States Patent [19]
Bigland

[11] 3,986,477
[45] Oct. 19, 1976

[54] WIRE COATING APPARATUS

[75] Inventor: Bernard Keith Bigland, Manchester, England

[73] Assignee: The General Engineering Co. (Radcliffe) Ltd., Manchester, Great Britain

[22] Filed: Mar. 15, 1976

[21] Appl. No.: 666,648

Related U.S. Application Data

[63] Continuation of Ser. No. 449,594, March 11, 1974, abandoned.

[52] U.S. Cl. .................................. 118/6; 118/7; 118/23; 118/405; 118/75; 425/113; 425/145
[51] Int. Cl.[2] .................................. B05C 3/12
[58] Field of Search .................................. 118/6–8, 118/75, 404, 405, 419, 420, DIG. 18, DIG. 19, DIG. 22; 425/113, 204, 114, 244, 376 A, 145–146; 57/7; 156/166

[56] References Cited
UNITED STATES PATENTS

| | | | |
|---|---|---|---|
| 2,006,333 | 7/1935 | Angell et al. | 57/7 |
| 2,680,880 | 6/1954 | Corbett | 425/376 A |
| 2,820,987 | 1/1958 | Bunch | 425/113 X |
| 2,904,846 | 9/1959 | Smith | 118/420 X |
| 3,060,056 | 10/1962 | Scott | 118/405 X |
| 3,499,186 | 3/1970 | Sassa | 425/204 X |
| 3,624,025 | 11/1971 | Twist | 425/113 X |
| 3,649,147 | 3/1972 | Fritsch | 425/376 A |
| 3,728,056 | 4/1973 | Theysohn | 425/145 X |
| 3,891,372 | 6/1975 | Takiura | 425/244 |

*Primary Examiner*—Morris Kaplan
*Attorney, Agent, or Firm*—James E. Nilles

[57] ABSTRACT

Apparatus for coating wire including a coating composition dispensing means and a feed means extending therefrom and to at least one positive displacement delivery unit associated with at least one wire coating die. The die has an outlet for extruding coating composition around a wire and a haul off device is provided for the coated wire. Means are also provided between the wire coating die and the haul off device and arranged positively to cool, cure or set the coating composition applied to the wire at the coating die. Means synchronize each the positive displacement delivery unit and its associated haul off device.

26 Claims, 8 Drawing Figures

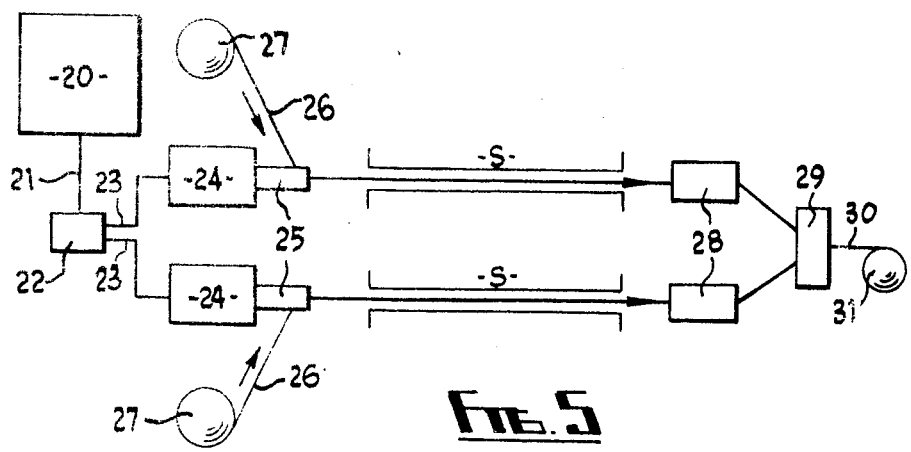
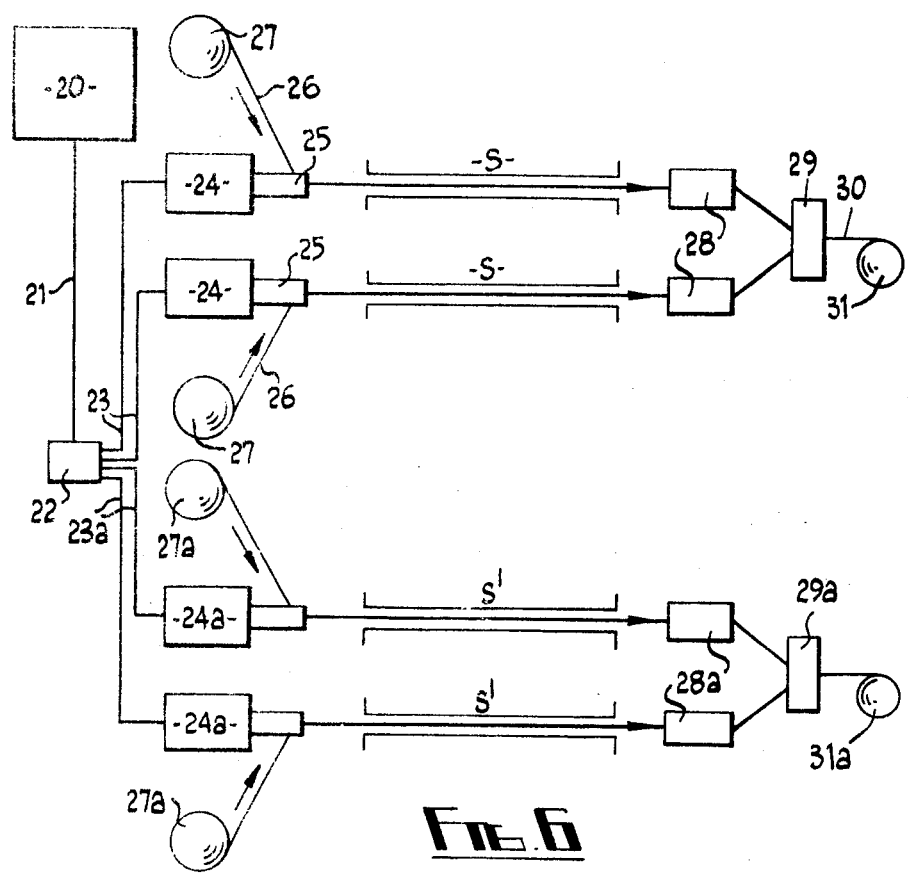

WIRE COATING APPARATUS

REFERENCE TO RELATED CO-PENDING APPLICATIONS

This is a continuation application from U.S. Ser. No. 449,594, filed Mar. 11, 1974, now abandoned.

This invention concerns the production of coatings on elongate elements such as cords, cables and wires, for example insulating converings on electrical conductors. For the sake of simplicity the elongate elements will be generically referred to as "wires". More particularly the coating material will be a thermoplastic or elastomeric material and again for the sake of simplicity these materials will be referred to generically as coating materials.

It is known to produce coated wires, such as electrical conductors with an insulating cover, using apparatus basically consisting of an extruder of screw form through which a coating material is passed to a die which surrounds a wire to be coated so that a coating is extruded around the wire, a cooling device for the coating, and a haul off device which enables the coated wire to be reeled or coiled. Such an apparatus has the disadvantage that unless the machine is controlled by skilled operatives expensive and complex control equipment is required for automatically controlling the machine. There are many variable parameters that have to be controlled to produce a consistently acceptable product. For example, during operation the speed of the extruder, and/or the haul off device can vary, as in fact, can the composition of the coating material and the temperature of the coating material or the extruder and all of these variable factors have to be taken into account. With regard to the variation in speed of operation of the extruder and haul off device this can be catered for by gearing the extruder to the haul off device so that a speed variation in one element causes a similar speed variation in the other. The gearing used may be physically achieved, for example, by mechanical connections or by the use of synchronised motors for driving the extruder and haul off device but this does not necessarily ensure that coating consistency can be achieved because of possible changes in coating composition or temperature. Variations in coating composition and temperature will, of course, have an effect upon coating consistency whether the extruder and haul off speeds are synchronised or not.

In an attempt to achieve consistency of coating it has been proposed to vary the haul off speed to cater for variations in extruder screw speed since it is easier to vary haul off speed and thus control consistency than to attempt to control consistency by variations of extruder screw speed since a change in screw speed does not result in a linear change of output rate.

It follows from the matters discussed above that control equipment must be applied to all of the mechanical elements of the apparatus and that, because of, for example, the non-linearity of output in relation to extruder speed, the synchronising operation is carried out when the apparatus is actually producing the coated wire. This inevitably results in the production of quantities of unevenly coated wire which are unusable. In addition there will be, for example, during running, inconsistencies in the process due to short term variations in power supply or coating composition which in time creates waste because the control mechanism requires time to compensate for such variations. In the past, development of the apparatus has followed the line that to achieve higher standards of consistency in output increasingly more elaborate control equipment had to be used.

The comments made above refer to the production of a wire coated with a single layer of coating material extruded on to the wire from a single extruder. When one takes into consideration that it is common practice to apply two or more coating materials to a wire in one operation requiring the use of two or more extruders it is evident that the problems referred to above are increased.

One of the prime uses for coated conductors is in the building of cables comprising two or more conductors. It will be seen from the comments made above that, if two or more wires were coated simultaneously to produce a finished cable the problems of obtaining a consistency of coating for all of the wires would be considerably increased. Therefore, the normal practice is to produce individual wires from which a cable is subsequently assembled. Generally cables are produced at much lower speeds than it is possible to produce single coated conductors, for example the ratio of speeds of production of coated conductors to cables may be of the order of 10:1 and consequently storage of single conductors is often necessary with the result that valuable and expensive space is non-productively occupied.

The present invention is based upon the appreciation that it may be possible to provide an apparatus in which the basic inconsistency of output rate from extruder is compensated for before the coating material is actually applied to the wire. This appreciation of the problem has enabled an apparatus to be produced in which it is possible in many cases to simplify the control apparatus and as a result of this enable the elements of the apparatus to be pre-synchronised so that as soon as operating speed is reached the wire covering has the required dimensions, and during production a high degree of consistency is maintained thus reducing waste. Thus if required the apparatus of the invention can be used economically to feed coated wires directly to a twisting, bunching or laying up or oversheathing apparatus thus eliminating or at least substantially mitigating the need to store individual coated wires until required for the production of cables.

Thus according to one aspect of the present invention an apparatus for coating wire includes a coating composition dispensing means, a feed means therefrom to at least one positive displacement delivery unit associated with at least one wire coating die having an outlet for extruding coating composition around a wire to be coated and a haul off device for coated wire.

According to a further aspect of the present invention there is provided a means for presynchronising the positive displacement delivery means with the haul off device.

Preferably there is provided means between the wire coating die and the haul off arranged positively to cool, cure or set the coating composition applied to the wire at the coating die.

Conveniently there is provided a plurality of positive displacement delivery units for coating composition associated with a single non-positive dispensing means for coating composition, there being a wire coating die associated with each positive displacement delivery unit and a haul off device for the coated wire. Preferably the positive displacement delivery units are pre-synchronised with each other.

According to a further aspect of the invention the positive displacement delivery units may also be pre-synchronised with the haul off device.

In one form of the apparatus the speed of the dispensing means can be controlled to maintain a pre-determined pressure at the inlet to the positive displacement delivery unit.

Alternatively the dispensing means and the positive displacement delivery unit are pre-synchronised.

In one form of apparatus there is provided a plurality of positive displacement delivery units each with a wire coating die, and a haul off and cabling device for the coated wires, whereby two or more wires may be formed into a cable.

Conveniently the haul off device incorporates a twisting, bunching, laying up or oscillating means whereby cable may be produced from coated wires as they are insulated.

In a still further form of the invention there is provided a sheathing die arranged to provide a sheath around the cable.

The positive displacement delivery means is conveniently a gear pump.

Alternatively the positive displacement delivery unit is an intermeshing positive displacement multi-screw pump.

Preferably the dispensing means is a screw extruder.

In one form of the invention the positive displacement delivery means and the dispensing means are pre-synchronised.

In an alternative form of the invention the positive displacement delivery means and the dispensing means may be driven at different rates to maintain a pre-determined pressure at the inlet to the positive displacement delivery means.

The invention will now be described further, by way of example only, with reference to two practical forms thereof and the accompanying drawings in which:

FIG. 5 is a block diagram illustrating schematically an apparatus for producing a pair of coated wires and a twin twisted cable therefrom.

FIG. 6 is a diagram similar to FIG. 2 showing a modification and

Figure 1:
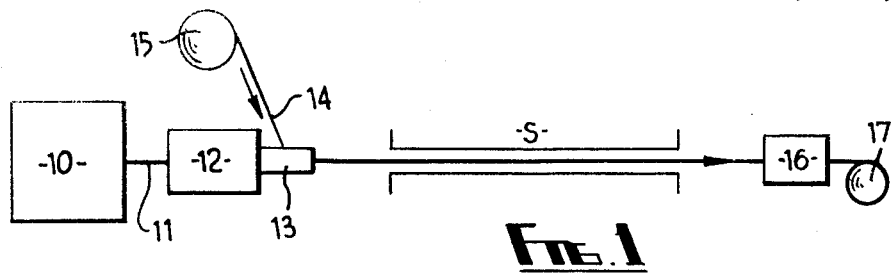
FIG. 1 is a block diagram illustrating schematically an apparatus for producing a single coated wire.

Referring first to FIG. 1 there is shown a dispensing means 10 from which coating composition is fed via a line 11 to a positive displacement delivery means 12 on to which is fixed a die head 13 to which coating composition is fed at a fixed delivery volume per unit time to an orifice through which a wire 14 to be coated passes centrally. The wire is fed to the die head from a supply means 15. The wire is thus, as it passes through the die orifice, coated with the coating composition. The coated wire passes from the die 3 through a cooling, curing or setting region S in which the coating composition is cooled, cured or set before reaching a haul off device 16 and passing on to a reel 17 or into a drum.

In the apparatus generally described above, assuming the coating composition to be thermoplastics material such as a polyamide, a polyolefin, or a vinyl material the dispensing means 10 may be in the form of a single screw extruder in which plastics material granules are worked to produce a homogenious mass; the positive displacement delivery means 12 may be a positive displacement gear pump. In the setting region S in this apparatus there may be provided water (or coolant) spray heads arranged to provide a conical curtain of water (or coolant) around the wire, the water or coolant being sprayed on to the wire so as to have a substantial component of velocity in the direction in which the coated wire is travelling; and the haul off device 16 may, in fact, be a driven reel on to which the wire is wound, that is the elements 16 and 17 shown in the diagram may be combined.

Whilst such an apparatus does not enable more than one wire to be coated it does enable the coating to be very accurately applied since despite unavoidable variations in the coating composition and other factors such as ambient temperature, supply voltage to the equipment and the like do occur and will result in variations in the temperature of the coating composition, then providing the output potential of the screw extruder is greater than the pump capacity the quantity of coating material fed to the die and thus on to the wire in unit time, varies within such small limits as to be considered for most practical purposes to be constant.

Figure 2:
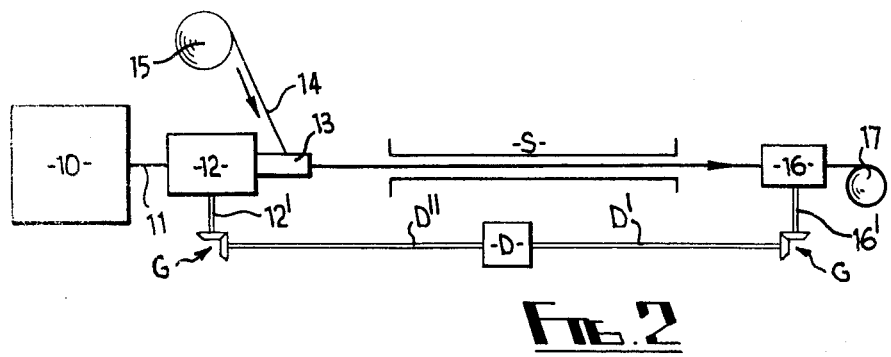
FIG. 2 is a diagram similar to FIG. 1 showing a modification.

It is possible, by way of a refinement of the apparatus to achieve an acceptable consistency of coating dimensions regardless of changes in speed of operation of the apparatus, and to achieve this it is necessary to pre-synchronise at least the haul-off and positive displacement delivery means so that if the haul-off speed is varied the delivery means speed varies in proportion. FIG. 2 shows diagrammatically one possible means in which pre-synchronisation can be achieved. As shown a common drive means D is provided for the positive displacement delivery means 12, and haul-off device 16, drive shafts D1 and D11 are provided from the drive means D and these, together with the shafts $12^1$ and $16^1$ and the bevel gears G serve to transmit drive. As referred to below other forms of drive can be used if desired.

Figure 3:
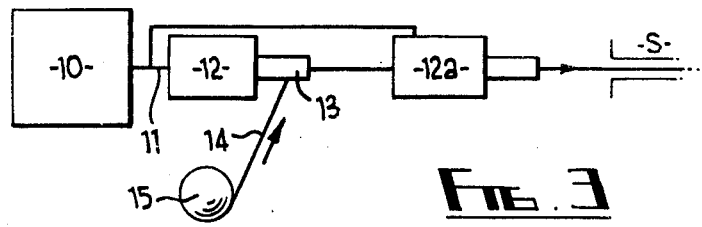
FIG. 3 is a diagram similar to FIG. 1 showing a further modification.

In a further refinement shown in FIG. 3, and to cater for the need to apply two or more coating materials to a single wire, it is possible to feed coating materials through separate positive displacement delivery units 12 and 12a to apply coatings to the wire in any known configuration, that is either as successively applied coatings each completely surrounding the wires, or as coatings each extending over part of the wire. Again it is possible to pre-synchronise the positive displacement delivery means with the haul off and/or each other.

Figure 4:
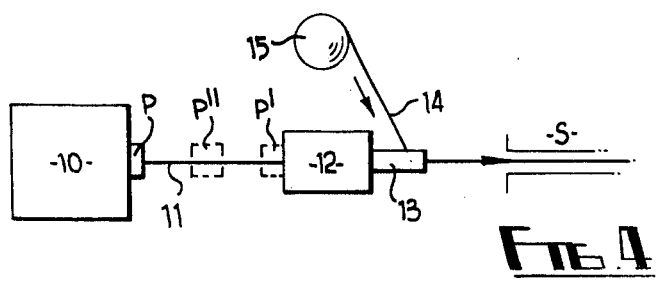
FIG. 4 is a diagram of part of the apparatus of FIG. 1 showing a further modification.

In a still further refinement, as shown in FIG. 4 a pressure responsive device P which serves to vary the output rate of the dispensing means 10 may be located in either the outlet end of the dispensing means 10; as shown in full line the inlet of the positive displacement delivery means 12; as shown in broken line at P1 or between the two in the line 11 as shown in broken line at P11, so that the pressure at the inlet of the positive displacement delivery means 12 is maintained constant. Alternatively the dispensing means and the positive displacement delivery means may be pre-synchronised by, for example, using a mechanical means such as that used to pre-synchronise the positive displacement delivery means 12 and the haul off 16 and indicated in FIG. 2.

In the apparatus shown in FIG. 5 there is provided a dispensing means 20 (such as a single screw conveyor of the kind referred to above) and this feeds a manifold 22, via a line 21, from which lines 23 feed a pair of positive displacement delivery means 24 (such as positive displacement gear pumps). Each means 24 is provided with a die head 25 to which a wire 26 to be coated is fed from a supply means 27 and from which a coated wire issues to pass through a region S in which the coating is cooled, cured or set. The wires are drawn through the apparatus so far described by means of a haul-off 28 from which they pass to a twisting head 29 from which issues a twin cable 30 which may then be reeled on to a reel 31 or deposited into a container. Whilst two haul-off's 28 have been illustrated in combination with a twisting head 29 it will be appreciated that this is for the sake of simplicity; any known device for hauling off and twisting may be used in practice.

Figure 7:
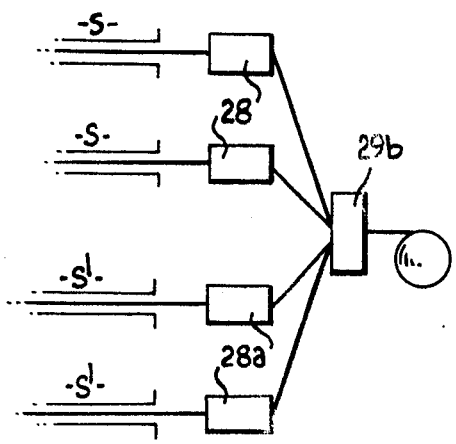
FIGS. 7 and 8 are diagrams of parts of the apparatus of FIG. 5 showing further modifications.
Figure 8:
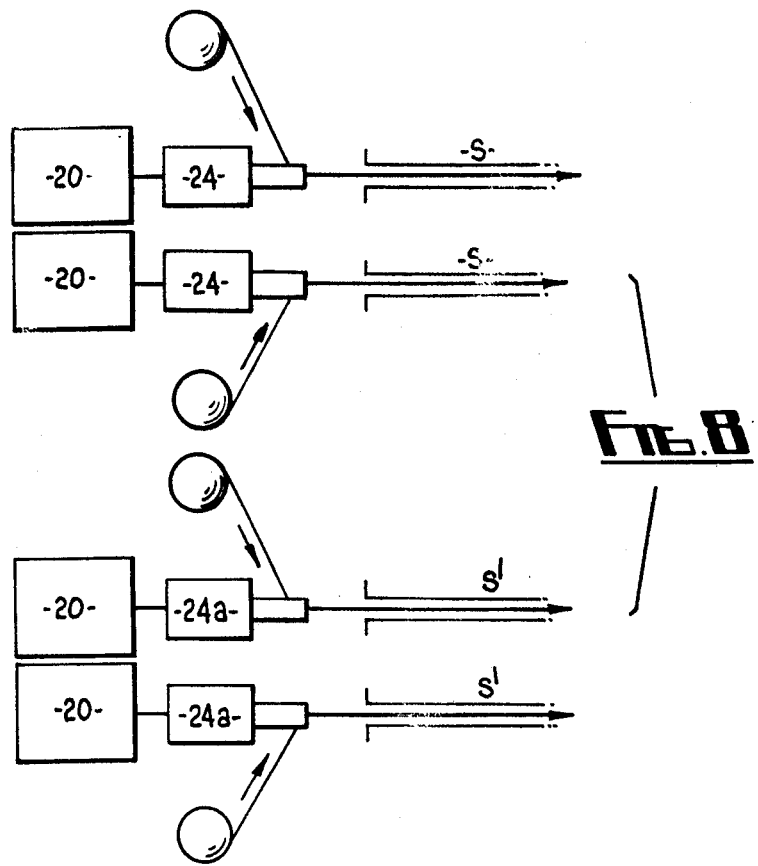

The apparatus of FIG. 5 may be modified for example as shown in FIG. 6 by providing more than two lines 23 from the manifold 22. As shown in FIG. 6 there are four such positive displacement delivery means the two numbered 24 being those of FIG. 5, and the two numbered 24a being the additional ones. Additional lines 23a are provided from the manifold 22 as well as additional cooling means S1, haul off means 28a, a twisting head 29a and cable reel 31a, together with additional wire supply means 27a. By using this arrangement two twin cables can be produced. By increasing the number of pairs of positive displacement delivery means, haul off's and twisting heads, a greater number of twin cables can be produced. As shown in FIG. 7 a cable with four wires can be produced by using only a single twisting head 29b, to which coated wires from the haul off's 28 and 28a are fed. By incresing the number of wires fed to the twisting head 29b other forms of cable can be produced. If desired triple wire cable can be produced or in fact a cable bundle can be produced which contains a great many wires. In a still further modification, shown in FIG. 8, each positive displacement delivery means 24, 24a may be supplied from its own dispensing means 20. This arrangement makes it possible to cover each wire with a different coating composition. The apparatus of FIG. 8 can be used either with the twisting and reeling arrangement of FIGS. 6 or 7 as desired.

As in the arrangement of FIG. 3 it is possible to make refinements to the apparatus of FIGS. 5 to 8 by pre-synchronising the positive displacement delivery means 24, 24a with each other and, as a further refinement, with the haul-off 28, 28a.

It should be borne in mind that whilst plastics material has been referred to wires can be coated with other coatings such as natural or synthetic rubber.

Constant displacement delivery means other than positive displacement gear pumps may be used, for example intermeshing positive displacement multi-screw pumps, and of course the type of apparatus used in the cooling, curing or setting region S will be dependent upon the type of coating material used.

To achieve pre-synchronisation as stated above it is possible to provide a direct mechanical drive connection between the elements to be pre-synchronised in which case a single variable speed drive can be used to drive the apparatus, or alternatively it is possible to use synchronous motors or positive displacement hydraulic motors to drive the elements individually.

Whilst the apparatus of FIGS. 5 to 8 will generally be used at coating speeds considerably less than those which can be used when coating a single wire, since coating speed must be commensurate with twisting or bundling speeds, the saving in space due to the obviation of the need to store reels or coils of coated wire and the increase in consistency of coating thickness is thought to compensate for any reduction in speed of coating that may be required.

I claim:

1. An apparatus for coating wire including a screw extruder coating composition dispensing means, at least one positive displacement delivery means for said coating composition, conduit means communicating between said coating composition dispensing means and said at least one positive displacement delivery means to deliver coating composition to said at least one positive displacement deliver means, means including a pressure responsive element for controllably synchronizing the feed rates of said dispensing and positive displacement delivery means, a wire feed means operatively associated with a coating die chamber, a said wire coating die chamber operatively associated with each said positive displacement delivery means to extrude said coating composition onto said wire, a haul-off device for said wire, and a means for synchronizing each said positive displacement delivery means with said haul-off device.

2. An apparatus as set forth in claim 1 in which said at least one positive displacement delivery means is a gear pump.

3. An apparatus as set forth in claim 1 in which said at least one positive displacement delivery means is an intermeshing positive displacement delivery multi-screw pump.

4. An apparatus as set forth in claim 1 in which said element is a pressure responsive device located at the outlet end of said coating composition dispensing means.

5. An apparatus as set forth in claim 1 in which said element is a pressure responsive device located at the input end of said at least one positive displacement delivery means.

6. An apparatus as set forth in claim 1 in which said element in a pressure responsive device located in said conduit between said coating composition dispensing means and said at least one positive displacement delivery means.

7. Apparatus as set forth in claim 1 in which the means for synchronizing said at least one positive displacement delivery means and said haul-off comprises a single variable speed drive member and a mechanical connection between said drive member and each element to be synchronized.

8. Apparatus as set forth in claim 1 in which the means for synchronizing said at least one positive displacement delivery means and said haul-off comprises a series of synchronous motors each adapted to drive an element to be synchronized.

9. An apparatus as set forth in claim 1 in which the means for pre-synchronizing said at least one positive displacement delivery means and said haul-off comprises a series of positive displacment hydrualic motors each adapted to drive an element to be synchronized.

10. An apparatus as set forth in claim 1 wherein said dispensing means is operatively associated with a plurality of wire coating systems and each system is inclusive of each said delivery means, feed means, die chamber, haul-off device, and each said synchronizing means.

11. An apparatus as in claim 10 wherein a cabling device is operatively associated with said haul-off devices whereby two or more wires may be formed into a cable.

12. An apparatus as in claim 11 wherein said cabling device incorporates a twisting means.

13. An apparatus as set forth in claim 1 for producing electric cable including coating composition dispensing means, including a plurality of said positive displacement delivery means adapted to be fed from said coating composition dispensing means, a said wire coating die for each positive displacement delivery means, a said wire feed means for each wire coating die, and a said haul-off device for each said wire and a cabling means for the coated wires, whereby each two or more wires may be formed into a cable.

14. An apparatus as set forth in claim 3 in which said cabling means incorporates a twisting means.

15. An apparatus as set forth in claim 13, in which said cabling means incorporates a bunching means.

16. An apparatus as set forth in claim 13, in which said cabling means incorporates laying-up means.

17. An apparatus as set forth in claim 13, in which said cabling means incorporates oscillating means.

18. An apparatus as set forth in claim 13, including a sheathing die whereby a cable may be sheathed as it is produced.

19. An apparatus as set forth in claim 13, in which cooling means is provided between each said wire coating die and said each haul-off.

20. An apparatus as set forth in claim 13, in which each said positive displacement delivery means is a gear pump.

21. An apparatus as set forth in claim 13, in which each said positive displacement delivery means is an intermeshing positive displacement delivery multi-screw pump.

22. An apparatus as set forth in claim 13, in which each said coating composition delivery means is a screw extruder.

23. An apparatus as set forth in claim 13, in which pre-synchronizing means is provided between each said haul-off and cabling means and said plurality of positive displacement delivery means.

24. Apparatus as set forth in claim 23, in which the means for pre-synchronizing said plurality of positive displacement delivery means and each said haul-off and cabling means comprises a single variable speed drive member and a mechanical connection between said drive member and each element to be pre-synchronized.

25. Apparatus as set forth in claim 23, in which the means for pre-synchronizing said plurality of positive displacement delivery means and each said haul-off and cabling means comprises a first synchronous motor adapted to drive said plurality of positive displacement delivery means, and a second synchronous motor adapted to drive said each haul-off and cabling means.

26. Apparatus as set forth in claim 23, in which the means for pre-synchronizing said plurality of positive displacement delivery means and said haul-off and each cabling means comprises a first positive displacement hydraulic motor adapted to drive said plurality of positive displacement delivery means, and a second positive displacement hydraulic motor adapted to drive said each haul-off and cabling means.

* * * * *